(12) United States Patent
Huang et al.

(10) Patent No.: US 11,036,700 B2
(45) Date of Patent: Jun. 15, 2021

(54) AUTOMATIC FEATURE GENERATION FOR MACHINE LEARNING IN DATA-ANOMALY DETECTION

(71) Applicant: Microsoft Technology Licensing, LLC, Redmond, WA (US)

(72) Inventors: Shen Huang, San Jose, CA (US); Huan Van Hoang, San Jose, CA (US); Yongzheng Zhang, San Jose, CA (US); Chi-Yi Kuan, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 159 days.

(21) Appl. No.: 16/237,137

(22) Filed: Dec. 31, 2018

(65) Prior Publication Data

US 2020/0210390 A1    Jul. 2, 2020

(51) Int. Cl.
| | | |
|---|---|---|
| *G06F 17/00* | (2019.01) | |
| *G06F 16/215* | (2019.01) | |
| *G06Q 10/10* | (2012.01) | |
| *G06F 16/28* | (2019.01) | |
| *G06N 20/00* | (2019.01) | |

(52) U.S. Cl.
CPC .......... *G06F 16/215* (2019.01); *G06F 16/285* (2019.01); *G06N 20/00* (2019.01); *G06Q 10/1053* (2013.01)

(58) Field of Classification Search
None
See application file for complete search history.

(56) References Cited

U.S. PATENT DOCUMENTS

| | | | |
|---|---|---|---|
| 9,117,178 B1* | 8/2015 | Chiu | G06F 16/00 |
| 9,473,380 B1* | 10/2016 | Bermudez | G06F 16/9535 |
| 2003/0081677 A1* | 5/2003 | Segman | H04N 7/0112 |
| | | | 375/240.13 |
| 2003/0217033 A1* | 11/2003 | Sandler | G06F 16/2272 |
| 2016/0110657 A1* | 4/2016 | Gibiansky | G06N 20/00 |
| | | | 706/12 |
| 2016/0292263 A1* | 10/2016 | Ferrar | G06N 20/00 |
| 2016/0328661 A1* | 11/2016 | Reese | G06N 3/0445 |
| 2017/0126734 A1* | 5/2017 | Harney | H04L 63/068 |
| 2018/0115622 A1* | 4/2018 | Zheng | H04L 67/06 |
| 2019/0108275 A1* | 4/2019 | Gulli | G06F 16/3322 |

(Continued)

*Primary Examiner* — Hasanul Mobin
(74) *Attorney, Agent, or Firm* — Schwegman Lundberg & Woessner, P.A.

(57) ABSTRACT

Methods, systems, and computer programs are presented for selecting features for a machine-learning model configured to detect anomalies in the evolution of data over time. One method includes an operation for identifying one or more key fields and value fields from the fields in a relational database. The method also includes grouping data of the value fields based on values of the one or more key fields and calculating one or more statistical values for each group of data of the value fields. The method further includes operations for monitoring an evolution of the one or more statistical values over time, and for selecting, based on the evolution of the one or more statistical values over time, features to be used by a machine-learning model to detect anomalies in content of the relational database over time. The method also includes executing the machine-learning model to detect the anomalies.

16 Claims, 11 Drawing Sheets

(56) References Cited

U.S. PATENT DOCUMENTS

| | | | |
|---|---|---|---|
| 2019/0146763 A1* | 5/2019 | Gould | G06F 21/552 |
| | | | 717/144 |
| 2019/0311287 A1* | 10/2019 | Chew | G06N 7/00 |
| 2019/0370347 A1* | 12/2019 | Levy | G06F 16/355 |
| 2020/0050680 A1* | 2/2020 | Murphy | G06F 16/26 |
| 2020/0126100 A1* | 4/2020 | Goyal | G06F 16/285 |

* cited by examiner

| ID | TITLE | COMPANY | LOCATION (ZIP) | SALARY | SKILL IDS | ... |
|---|---|---|---|---|---|---|
| 1 | DATA SCIENTIST | A | 95070 | 95K | S1, S2 | |
| 2 | SOFTWARE DEVELOPER | B | 45050 | 90K | S10, S11, S12 | |
| 3 | SECURITY OFFICER | A | 95070 | 55K | S77 | |
| 4 | DATA SCIENTIST | A | 45050 | 90K | S1, S2, S4 | |
| 5 | ADMIN ASSISTANT | A | 34567 | 60K | S22 | |
| 6 | DATA SCIENTIST | C | 95070 | 100K | S2, S4 | |
| 7 | ADMIN ASSISTANT | A | 45050 | 95K | S22, S24, S25 | |
| 8 | SECURITY OFFICER | D | 95070 | 50K | S77 | |
| 9 | DATA SCIENTIST | D | 95070 | 110K | S4, S7 | |
| 10 | DATA SCIENTIST | D | 34567 | 100K | S1, S2, S4 | |
| 11 | SOFTWARE DEVELOPER | E | 95070 | 130K | S11, S12, S14 | |
| 12 | SECURITY OFFICER | F | 45050 | 60K | S77 | |
| 13 | ADMIN ASSISTANT | B | 45050 | 40K | S24 | |
| 14 | ADMIN ASSISTANT | B | 95070 | 80K | S22, S24, S25 | |
| 15 | SOFTWARE DEVELOPER | B | 12345 | 120K | S1, S4 | |

DATA GROUPING BY FIELD TITLE

602

| ID | TITLE | COMPANY | LOCATION (ZIP) | SALARY | SKILL IDS | ... |
|---|---|---|---|---|---|---|
| 1 | DATA SCIENTIST | A | 95070 | 95K | S1, S2 | |
| 4 | | A | 45050 | 90K | S1, S2, S4 | |
| 6 | | C | 95070 | 100K | S2, S4 | |
| 9 | | D | 95070 | 110K | S4, S7 | |
| 10 | | D | 34567 | 100K | S1, S2, S4 | |
| ... | | | ... | ... | ... | |
| 2 | SOFTWARE DEVELOPER | B | 45050 | 90K | S10, S11, S12 | |
| 11 | | E | 95070 | 130K | S11, S12, S14 | |
| 15 | | B | 12345 | 120K | S1, S4 | |
| ... | | | ... | ... | ... | |
| 3 | SECURITY OFFICER | A | 95070 | 55K | S77 | |
| 8 | | D | 95070 | 50K | S77 | |
| 12 | | F | 45050 | 60K | S77 | |
| ... | | | ... | ... | ... | |
| 5 | ADMIN ASSISTANT | A | 34567 | 60K | S22 | |
| 7 | | A | 45050 | 95K | S22, S24, S25 | |
| 13 | | B | 45050 | 40K | S24 | |
| 14 | | B | 95070 | 80K | S22, S24, S25 | |
| ... | | | | | | |

AUTOMATIC FEATURE GENERATION FOR MACHINE LEARNING IN DATA-ANOMALY DETECTION

TECHNICAL FIELD

The subject matter disclosed herein generally relates to methods, systems, and machine-readable storage media for selecting features for machine-learning models that identify anomalies in the evolution of data over time.

BACKGROUND

The detection of data anomalies is an important concern for data managers who analyze the evolution of data, especially in the presence of large data sets. Some applications (e.g., system management, database management, detection of trends) require the analysis of large volumes of data, including how the data evolves. When the data evolution shows drastic changes, the application may detect a problem, but sometimes the changes may be due to problems in collecting and analyzing the data, instead of actual problems in the data being analyzed.

Some systems aim to discover abnormal changes in large-scale data sets over time to detect system defects. However, large data sets may include a large number of variables, and the complexity of detecting anomalies in the presence of the large number of variables is very high.

Thus, identifying which variables should be analyzed is important to enable fault-detection systems to focus on those variables that provide good indicators of when anomalies occur.

BRIEF DESCRIPTION OF THE DRAWINGS

Various ones of the appended drawings merely illustrate example embodiments of the present disclosure and cannot be considered as limiting its scope.

FIG. 4 is a data table with fields used for detecting data anomalies, according to some example embodiments.

FIG. 6 illustrates the grouping of data for value fields, according to some example embodiments.

DETAILED DESCRIPTION

Figure 1:
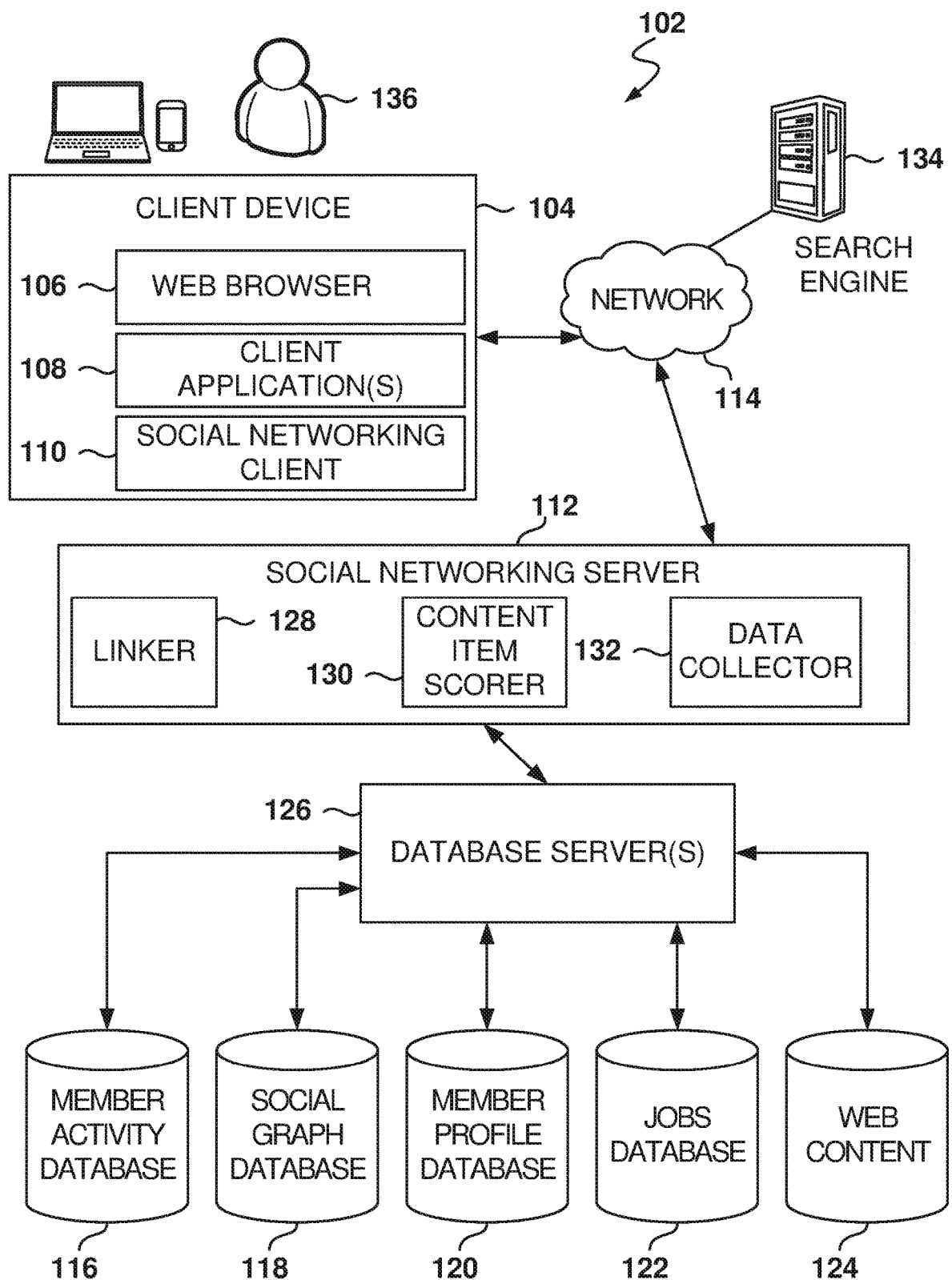
FIG. 1 is a block diagram illustrating a networked system, according to some example embodiments.

Example methods, systems, and computer programs are directed to selecting features for a machine-learning model configured to detect anomalies in the evolution of data over time. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Detecting variations in the evolution of data (e.g., anomalies or outliers) is a difficult task when dealing with large data sets. Machine-learning programs are utilized to assist in this detection. However, one of the challenges for effective machine-learning methodologies is the generation of features for machine learning. Sometimes, two or more data fields may be aggregated to generate a new feature, and this new feature might provide high probative value for the machine-learning methodology.

Embodiments present techniques for selecting features that improve the performance of a machine-learning program that analyzes large data sets for detecting anomalies in the evolution of the data available over time. Some features may be created by aggregating two or more fields, and these features may increase the ability of the machine-learning model to detect data anomalies. One or more fields are identified as key fields, and the data for the remaining value fields is aggregated. Statistical analysis is performed on the aggregated data to determine which fields provide better indications that anomalies are present in the data.

In some implementations, the performance of a field for fault detection is analyzed by aggregating the data according to that field and then calculating the entropy. The entropy is then analyzed to see if aggregating by this field provides value for data analysis. By analyzing multiple fields based on their entropy, a selection is made of those fields that provide the highest value for the machine-learning model to detect anomalies.

Search Engine Optimization (SEO) is used to generate more-relevant links to place in web pages in order to improve the visibility (e.g., ranking of the results from a search engine) of the desired web pages. When dealing with a large number of web pages (e.g., ten million job-post web pages), SEO is a complex problem, and machine-learning models are used to select the best links for placement in the web pages. However, if there are anomalies in the data, SEO will not operate on the correct data and the results will not be optimal. For example, some job postings will be given more visibility that they should receive while other job postings that should be receiving high visibility will not have enough exposure. By monitoring the data and detecting possible anomalies in the data, the SEO system will optimize the links in the webpages and the visibility of job posts will match their relative priority, which will result in better system performance, improved user satisfaction, and more revenue to the service provider.

One general aspect includes a method that includes an operation for identifying one or more key fields and value fields from the fields in a relational database. The data of the value fields are then grouped based on the values of the one or more key fields. Further, statistical values are calculated for each group of data of the value fields and the evolution of the statistical values is monitored over time. Based on the evolution of the statistical values over time, features are selected to be used by a machine-learning model to detect anomalies in the content of the relational database over time. The machine-learning model is executed to detect the anomalies in the content of the relational database.

Some embodiments are presented with reference to SEO for selecting the machine-learning features. However, the principles presented may be utilized with any data set in order to select the best fields and combinations of fields that may act as features for machine-learning models used to find conclusions based on the data set.

FIG. 1 is a block diagram illustrating a networked system, according to some example embodiments, including a social networking server 112, illustrating an example embodiment of a high-level client-server-based network architecture 102. Embodiments are presented with reference to an Internet service, but the principles used herein may be used for any online service accessed by users, such as a social network.

The social networking server 112 provides server-side functionality via a network 114 (e.g., the Internet or a wide area network (WAN)) to one or more client devices 104. FIG. 1 illustrates, for example, a web browser 106, client application(s) 108, and a social networking client 110 executing on a client device 104. The social networking server 112 is further communicatively coupled with one or more database servers 126 that provide access to one or more databases 116-124.

The client device 104 may comprise, but is not limited to, a mobile phone, a desktop computer, a laptop, a portable digital assistant (PDA), a smart phone, a tablet, a netbook, a multi-processor system, a microprocessor-based or programmable consumer electronic system, or any other communication device that a user 136 may utilize to access the social networking server 112. In some embodiments, the client device 104 may comprise a display module (not shown) to display information (e.g., in the form of user interfaces). In further embodiments, the client device 104 may comprise one or more of touch screens, accelerometers, gyroscopes, cameras, microphones, Global Positioning System (GPS) devices, and so forth.

In one embodiment, the social networking server 112 is a network-based appliance that responds to initialization requests or search queries from the client device 104. One or more users 136 may be a person, a machine, or other means of interacting with the client device 104. In various embodiments, the user 136 is not part of the network architecture 102 but may interact with the network architecture 102 via the client device 104 or another means.

The client device 104 may include one or more applications (also referred to as "apps") such as, but not limited to, the web browser 106, the social networking client 110, and other client applications 108, such as a messaging application, an electronic mail (email) application, a news application, and the like. In some embodiments, if the social networking client 110 is present in the client device 104, then the social networking client 110 is configured to locally provide the user interface for the application and to communicate with the social networking server 112, on an as-needed basis, for data and/or processing capabilities not locally available (e.g., to access a member profile, to authenticate a user 136, to identify or locate other connected members, etc.). Conversely, if the social networking client 110 is not included in the client device 104, the client device 104 may use the web browser 106 to access the social networking server 112.

Further, while the client-server-based network architecture 102 is described with reference to a client-server architecture, the present subject matter is of course not limited to such an architecture, and could equally well find application in a distributed, or peer-to-peer, architecture system, for example.

In addition to the client device 104, the social networking server 112 communicates with the one or more database servers 126 and databases 116-124. In one example embodiment, the social networking server 112 is communicatively coupled to a member activity database 116, a social graph database 118, a member profile database 120, a jobs database 122, and a web content database 124. The databases 116-124 may be implemented as one or more types of databases including, but not limited to, a hierarchical database, a relational database, an object-oriented database, one or more flat files, or combinations thereof.

The member profile database 120 stores member profile information about members who have registered with the social networking server 112. With regard to the member profile database 120, the member may include an individual person or an organization, such as a company, a corporation, a nonprofit organization, an educational institution, or other such organizations.

Consistent with some example embodiments, when a user initially registers to become a member of the social networking service provided by the social networking server 112, the user is prompted to provide some personal information, such as name, age (e.g., birth date), gender, interests, contact information, home town, address, spouse's and/or family members' names, educational background (e.g., schools, majors, matriculation and/or graduation dates, etc.), employment history (e.g., companies worked at, periods of employment for the respective jobs, job title), professional industry (also referred to herein simply as "industry"), skills, professional organizations, and so on. This information is stored, for example, in the member profile database 120. Similarly, when a representative of an organization initially registers the organization with the social networking service provided by the social networking server 112, the representative may be prompted to provide certain information about the organization, such as a company industry. This information may be stored, for example, in the member profile database 120.

As members interact with the social networking service provided by the social networking server 112, the social networking server 112 is configured to monitor these interactions. Examples of interactions include, but are not limited to, commenting on posts entered by other members, viewing member profiles, editing or viewing a member's own profile, sharing content outside of the social networking service (e.g., an article provided by an entity other than the social networking server 112), updating a current status, posting content for other members to view and comment on, posting job suggestions for the members, searching job posts, and other such interactions. In one embodiment, records of these interactions are stored in the member activity database 116, which associates interactions made by a member with his or her member profile stored in the member profile database 120.

The jobs database 122 includes job postings offered by companies. Each job posting includes job-related information such as any combination of employer, job title, job description, requirements for the job, salary and benefits, geographic location, one or more job skills required, day the job was posted, relocation benefits, and the like.

The web content database 124 includes web pages provided by the social networking server 112. The web content database 124 stores content items, data that is used to generate web pages of a particular web site (that may be hosted by social networking server 112), search results, and/or data about accesses to, and user interactions with, the content items. A web page is a content item that contains one or more links that link to one or more content items. A web page may be linked to by one or more other web pages. A content item might not have any links to other content items. Example content items include a web page, a text file, an audio file, a video file, and an executable.

While the database server(s) 126 are illustrated as a single block, one of ordinary skill in the art will recognize that the database server(s) 126 may include one or more such servers. Accordingly, and in one embodiment, the database server(s) 126 implemented by the social networking service are further configured to communicate with the social networking server 112.

The social networking server 112 includes, among other modules, a linker 128, a content item scorer 130, and a data collector 132. Each of the data collector 132, the content item scorer 130, and the linker 128 may be implemented in software, hardware, or any combination of software and hardware. Although depicted separately, the data collector 132, the content item scorer 130, and the linker 128 may be implemented as one component.

The network architecture 102 may also include a search engine 134. Although only one search engine 134 is depicted, the network architecture 102 may include multiple search engines. Thus, the social networking server 112 may retrieve search results (and, potentially, other data) from multiple search engines. The search engine 134 may be a third-party search engine. Examples of the search engine 134 include Bing, Ask, and search engines provided by Google, Yahoo!, Baidu, and AOL.

The search results stored in the web content database 124 are results of searches that have been previously performed by the search engine 134. Each search is performed based on one or more keywords. A search engine result may contain multiple search result entries, each entry corresponding to a particular content item (e.g., web page). A search engine result may comprise one or more search result pages, where each search result page includes one or more entries.

In the web content database 124, a search result data item indicates (or identifies) a content item (e.g., using a content item identifier) and position data of the content item. Position data may include a search results page number (identifying which page of a search engine result the content item appeared on) and/or a ranking value that indicates where the content item appeared in a search engine result relative to other content items identified as a result of the corresponding search, such as first, second, third, one hundredth, etc. A search result data item may also include or indicate a timestamp of when the corresponding search result was generated or returned to the social networking server 112.

The data collector 132 collects data about each of multiple content items. The data collector 132 may examine multiple sources of data in order to collect the data, such as searching search logs indicating user behavior relative to a content item, submitting search queries to the search engine 134 to perform searches and analyzing the results of those searches, and analyzing text of certain portions of the content items. Some of the information collected from external data sources includes search engine results using certain keywords as search terms, such as people's names, company names, job titles, job skills, salary, learning-related keywords, etc. Each search engine result may indicate a ranking of a content item from the website in question along with, optionally, a page number of the page on which the content item was found. The data collector 132 may also compare two search results that have the same content item and that are generated using the same search query, but that are generated at different times, such as a month apart.

For each content item, the content item scorer 130 generates a score for the content item based on the data collected by the data collector 132 for that content item. In some example embodiments, the content item scorer 130 may implement a rule-based model or a machine-learned model. The rule-based model may be similar to the machine-learned model, except that the weights or coefficients for attributes that are considered in generating a score are established manually, instead of being determined using a machine-learning technique.

The score for a content item may take into account one or more attributes pertaining to the content item itself and, optionally, one or more attributes pertaining to a combination of the content item and a source page (i.e., that links (or might link) to the content item). Thus, the content item scorer 130 may generate multiple scores for a content item, one score for each content item-source page pair.

For a particular web page, the linker 128 uses the scores relative to multiple candidate content items to select a subset of the candidate content items to which the particular web page should include a link (e.g., a URL). For example, the linker 128 may rank the multiple candidate content items by score and select the top N candidate content items. The linker 128 then includes a link in the particular web page for each content item in the subset.

In an embodiment, the linker 128 considers one or more criteria (other than scores) when including links in a web page to one or more content items. An example criterion includes a number of other web pages that already contain a link to the content item. This criterion may be used to ensure that the same content item is not linked to by all, most, or a relatively large plurality of web pages of a web site.

Figure 2B:
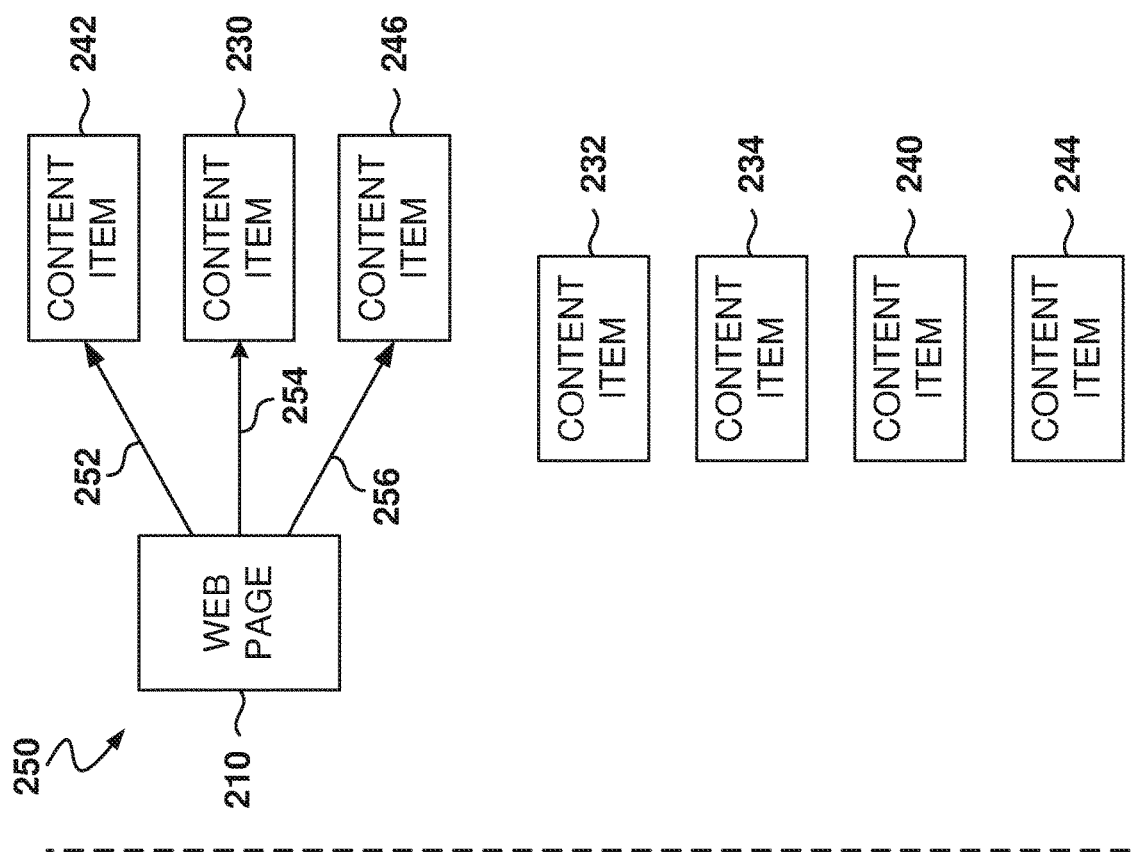
FIGS. 2A-2B are block diagrams that depict example link structures before and after updating links from a web page, according to some example embodiments.
Figure 2A:
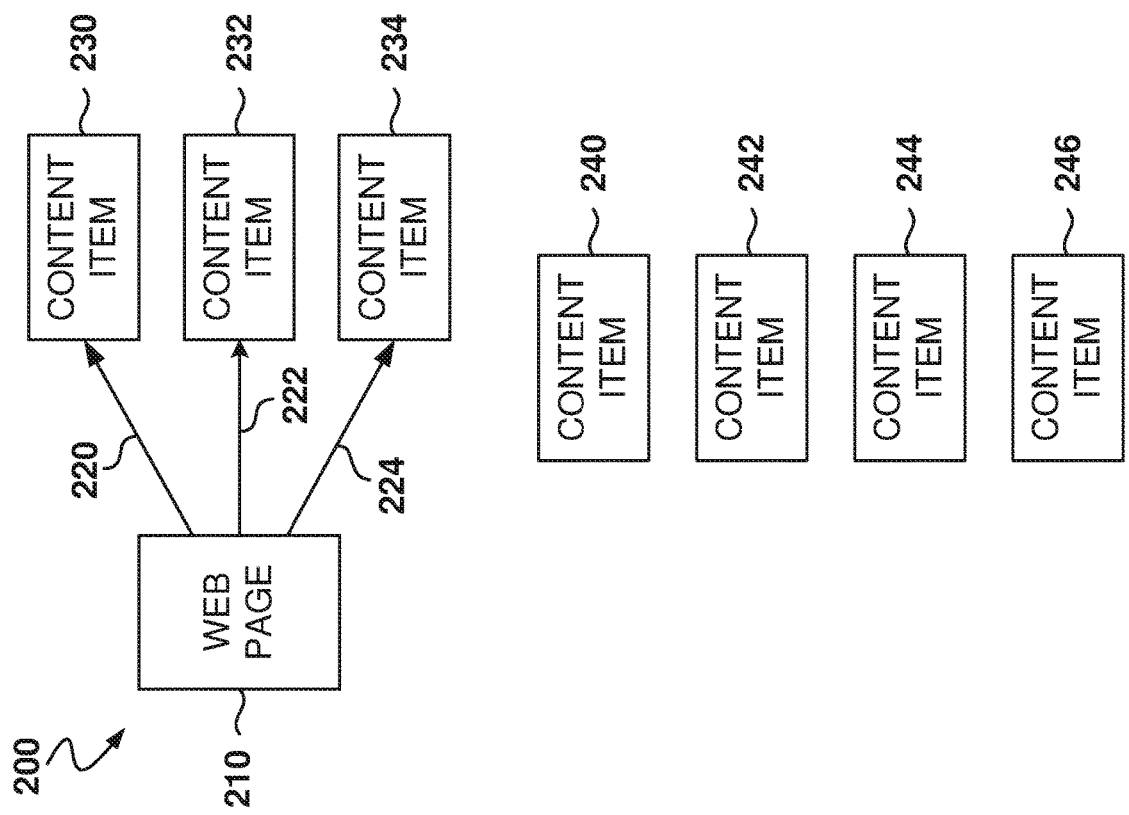

FIGS. 2A-2B are block diagrams that depict example link structures before and after updating links from a web page, according to some example embodiments. In FIG. 2A, a web page 210 includes links 220-224 to content items 230, 232, and 234 respectively. Additionally, candidate content items 240, 242, 244, and 246 are not currently linked to by the web page 210. One or more of the candidate content items 240, 242, 244, and 246 may be linked to by one or more other web pages (not depicted).

The data collector 132 collects data about each of the content items 230, 232, and 234 and the candidate content items 240, 242, 244, and 246. The content item scorer 130 generates a score for each of the content items. The linker 128 ranks the content items by the score, selects a plurality of content items (e.g., three content items), and updates the web page 210 to include links 252, 254, and 256 to the content items 242, 230, and 246, respectively, as illustrated in FIG. 2B.

Thus, the second version of the web page 210 in FIG. 2B no longer includes a link to either of the content items 232 or 234. Also, in this example, the slots in the web page 210 for inclusion of links to content items are ordered. Thus, while the content item 230 may be considered to be in the "first" slot of the web page 210 under a link structure 200, the content item 230 has moved to the "second" slot of the web page 210 under a link structure 250.

Figure 3:
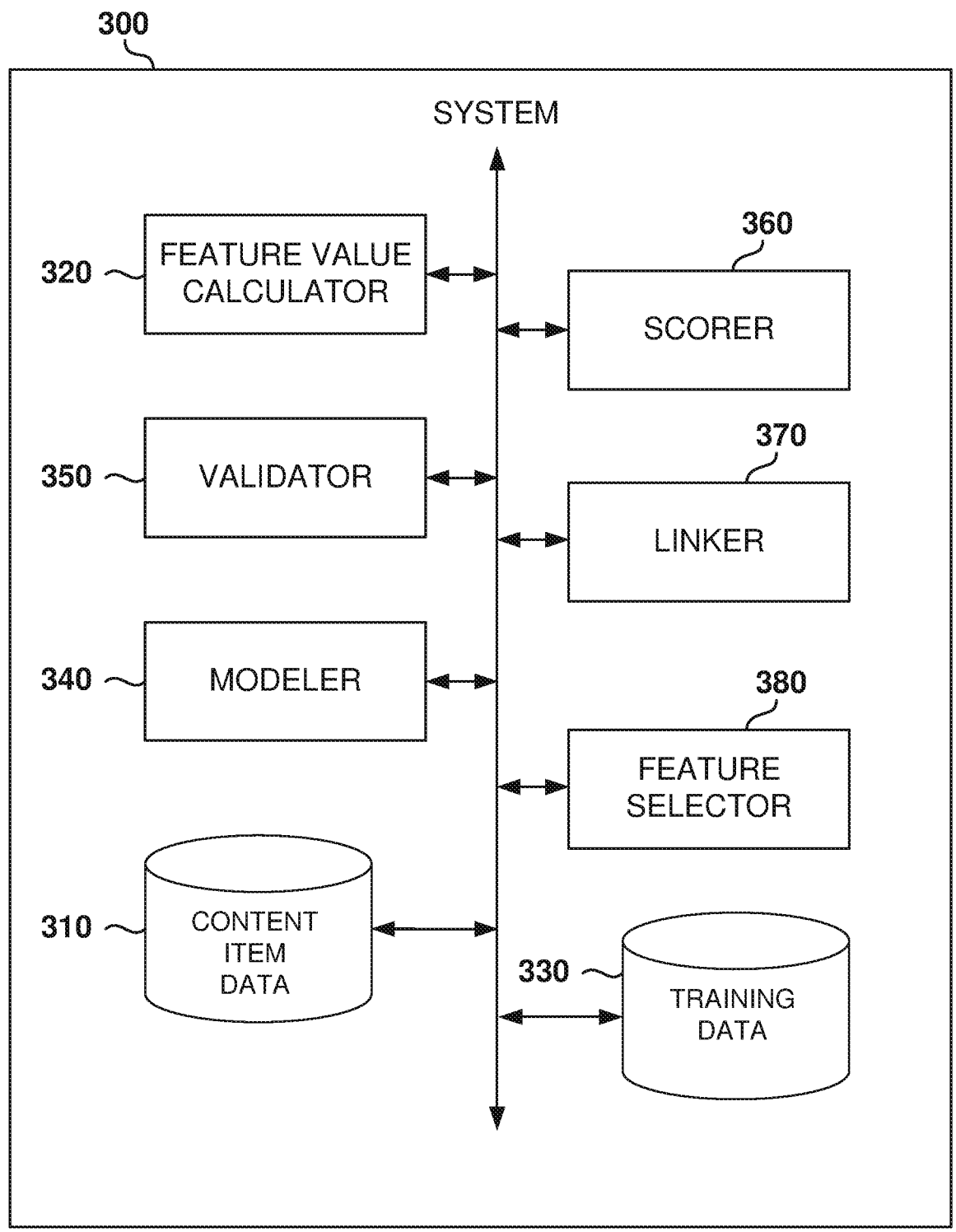
FIG. 3 is a block diagram that depicts an example scoring system for scoring content items and for selecting features, in an embodiment.

FIG. 3 is a block diagram that depicts an example scoring system 300 for scoring content items and for selecting features, in an embodiment. The scoring system 300 includes content item data 310, a feature value calculator 320, training data 330, a modeler 340, a validator 350, a scorer 360, a linker 370, and a feature selector 380. The feature value calculator 320, the modeler 340, the validator 350, the scorer 360, the linker 370, and the feature selector 380 are implemented in software, hardware, or any combination of software and hardware.

The content item data 310 includes data about each content item, and different portions of the content item data 310 may have been collected by the data collector 132 from different data sources, such as a third-party search engine or a log of user accesses to various content items. The content item data 310 also indicates, for each content item, one or more rankings of the content item.

The feature value calculator 320 analyzes the content item data 310 and generates the training data 330. For example, a feature may be an average staying time of requestors of a content item. Thus, the feature value calculator 320 analyzes multiple access logs pertaining to multiple requestors of the content item during a period of time (e.g., the last month). The feature value calculator 320 includes a label for each training instance, the label indicating a ranking or being based on one or more rankings, such as whether a positive or negative change in rankings occurred for the content item over the same (or a different) period of time.

The modeler 340 implements one or more machine-learning techniques to generate a scoring model for web links based on the training data 330, or at least a portion thereof.

The validator 350 validates the generated scoring model using a portion of the training data 330, preferably a portion that was not used to generate the scoring model.

The linker 370 takes scores generated by the scorer 360 as input and determines which of the corresponding scored content items will be linked to by one or more web pages of a website. The score for a particular content item may be used to determine whether it should be linked to by multiple web pages. Alternatively, the same content item may be scored multiple times by the scorer 360, once for each web page that can contain a link to the content item.

In some example embodiments, multiple scoring models (rule-based or machine-learned) are constructed. Each scoring model may score a different set of content items. Content items may be assigned to a set depending on different criteria, such as type of content item. "Type" may refer to the type of content, such as text, audio, or video, or to a file type.

Some content items may be classified as learning pages, each containing information about a different topic for which learning materials are available. Example topics include the basics of programming, graphic design, IT management, onboarding talent, improving performance reviews, and developing leaders.

Some content items may be classified as job title pages, each containing information about a set of job openings associated with a particular job title or a set of job titles associated with a particular job function.

In an embodiment, a web page includes multiple slots for inserting links. Each slot corresponds to a different link. A link to a content item may be assigned to a slot of a web page when the web page is requested or may be assigned after the content item is scored (e.g., by the content item scorer 130) along with other candidate content items for the web page.

There may be many candidate content items to which the web page can contain a link. The linker 128 selects a subset of the candidate content items and includes, in each slot, a link to a content item in the subset.

In an embodiment, a web page includes different sets of one or more slots, each set of slots corresponding to a different set of one or more content items. For example, a web page may include a first set of one or more slots for profile pages, a second set of one or more slots for company pages, and a third set of one or more slots for job listing pages. The candidate content items corresponding to each set of slots may have been scored using a different scoring model.

If no source page-content item attribute/feature is considered when scoring content items, then the content item scorer 130 generates a single score for each candidate content item. If there is at least one source page-content item attribute/feature considered when scoring candidate content items, then the content item scorer 130 generates a score for each web page-candidate content item pair. Thus, some candidate content items may be scored multiple times, each time in association with a different web page. For each web page, however, only those candidate content items that have been scored relative to that web page may be considered when selecting which candidate content items will be linked to by the web page. Thus, each web page may be associated with a ranked list of candidate content items to which the web page can link. The highest-ranked candidate content items corresponding to a web page may be selected and a link to each of those highest-ranked candidate content items inserted into the web page, which may involve removing links to other content items to which the web page previously linked.

The feature selector 380 selects features to be used by a machine-learning model to detect anomalies in the evolution of data. The selected features may be fields in the content item data 310, or may be features resulting from aggregating two or more fields in the content item data 310.

FIG. 4 is a data table 402 with fields used for detecting data anomalies, according to some example embodiments. Sometimes, data changes substantially from one tracking period to the next. For example, the data in a field doubles in value when historically the data has shown increments or decrements of 10% or less. For example, a job website has 10 million job posts on a given day, on average. Suddenly, there are only 1 million job posts, which is a good indicator that something has gone wrong, such as internal data systems, job-posted systems, job-collection systems, etc.

In another example, a given company has 2000 open job posts, plus or minus 200, over the last year, and suddenly the number of job posts for the company drops to 10. The analysis of fields in the data table 402 would not detect the changes for the company, because there is not one field just for the given company and the total number of jobs for all the companies may not vary significantly. However, by aggregating the data by the Company field and analyzing the group data for each value of the Company field, it is possible to detect that the number of job posts for the given company has suddenly dropped. This could indicate a problem in the downloading of job-post data for the given company.

An anomaly is a sudden change in the behavior of a system, where the sudden change is greater than previous changes of the data over time. In some example embodiments, thresholds are set for the percentage change in the data in order to determine when an anomaly has taken place.

The thresholds may vary for each field and can be in the range from 1% to 50% or more, depending on the intrinsic variability for each field.

When dealing with large data sets, it is difficult to detect these data changes quickly, simply by human inspection or by waiting to detect a large number of complaints from users. Machine-learning models are utilized to analyze the evolution of large data sets to detect anomalies.

The data table 402 illustrates a section of the data set with multiple fields, such as job ID, title, company, location, salary, skill identifiers, etc. Only a section of the data table 402 is illustrated in FIG. 4. The data of the data table 402 relates to job posts, but the same principles may be applied to other types of data.

The job identifier (ID) is a unique value that identifies each entry in the data table 402. The title field describes the title associated with the job posts. In some example embodiments, the title may be a standardized title, where there are a plurality of predefined titles and each title in the title field is one of the plurality of predefined titles.

The company field identifies the company posting the job. The location field indicates the place where the job is to be performed. The salary field describes the salary offered for the job, although some job posts may not have a salary identified, or some job posts may identify a range of possible salaries. Skill IDs are identifiers for the skills desired for the job. In some example embodiments, the skill IDs are coded as a number and the skill IDs may be part of one from a plurality of predetermined skill IDs. The skill IDs may be represented by a numerical value, in some example embodiments. There could be many more fields associated with each job post, such as a date the job was posted, an expiration date for the job, a location of company headquarters, other titles that may be compatible with the job, a company size, etc.

Thus, the job with job ID 1 is for a data scientist in company A, at a location in ZIP Code 95070, with the salary of $95,000, and skills S1 and S2 desired (e.g., machine learning and data science).

Figure 5:
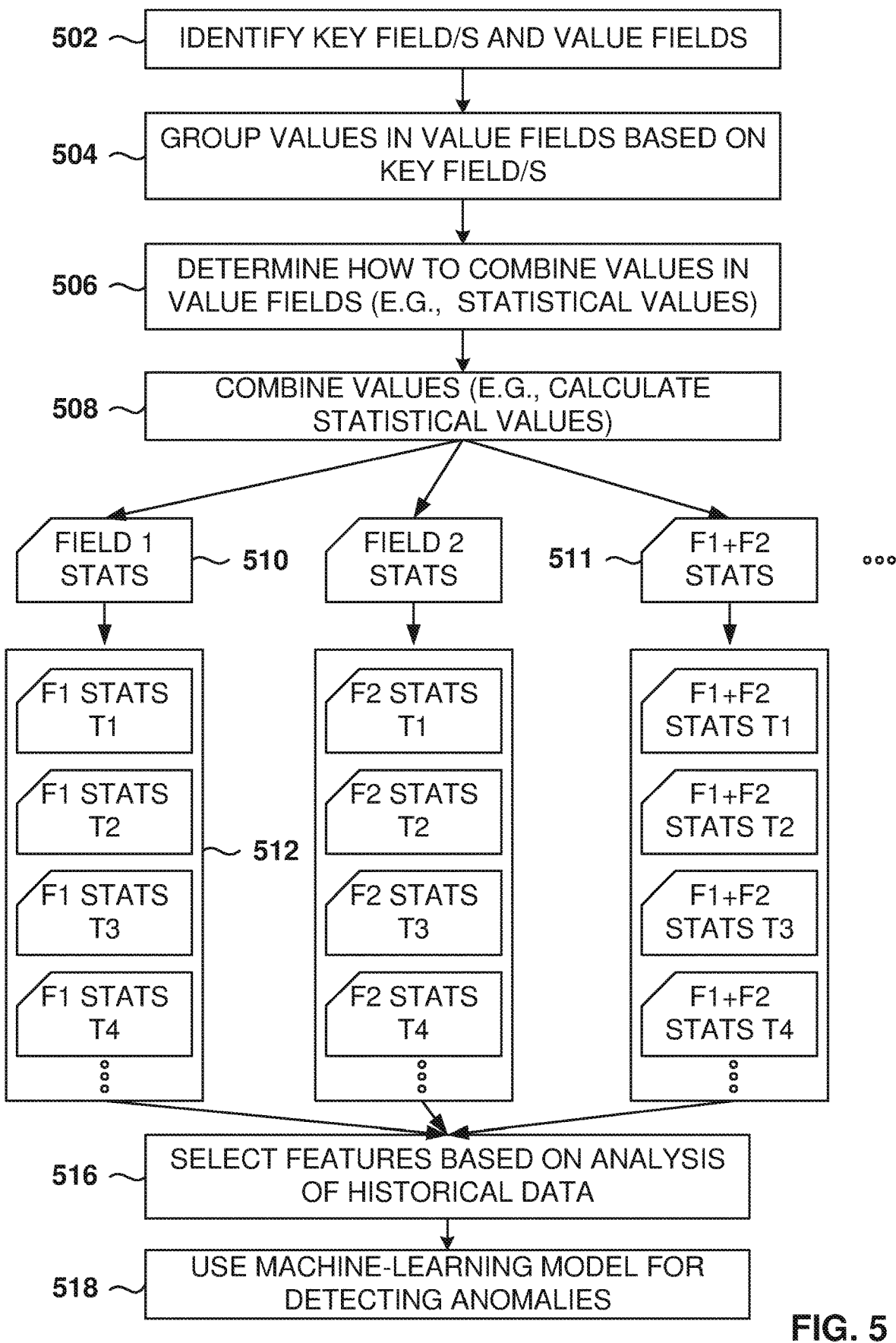
FIG. 5 is a flowchart of a method for selecting features to be used by a machine-learning model to detect data anomalies, according to some example embodiments.

FIG. 5 is a flowchart of a method for selecting features to be used by a machine-learning model to detect data anomalies, according to some example embodiments. The method transforms relational-type data sets to multi-dimensional data sets in order to generate features for machine-learning models.

Data fields are divided into key fields and value fields. Key fields define the aggregation of data of the value fields; for example, for each value or unique combination of values of the key fields, the data of the corresponding value fields is combined according to some predefined method, such as by generating vectors with the values of the fields or calculating statistical values of the values.

For example, in the data table 402 of FIG. 4, two key fields of title and company are defined. Then, for each unique pair of title and company, an average salary (a value field) may be calculated to obtain average salaries for data scientists at company A, data scientists at company B, data scientists at company C, etc., software developers at company A, software developers at company B, etc., security officers at company A, security officers at company B, etc.

If only the title is selected as a key field, the value fields may be aggregated to obtain average salaries for data scientists, software developers, security officers, etc. More details are provided below with reference to FIG. 6, showing an example of aggregation by the title field.

At operation 502, the key fields and the value fields are identified. The key fields may be identified by a user or by a program, and the fields that are not key fields are value fields. If there are n fields, and m fields are selected as key fields, then (n-m) fields are value fields. The value of m is an integer between 1 and (n-1). Just one field may be defined as the key field, or a plurality of fields may be key fields, and any combination of fields may be selected.

From operation 502, the method flows to operation 504 for grouping values in the value fields based on the key fields. "Grouping" refers to combining the data for the corresponding value fields, such as by creating a list of values or calculating a statistical measurement of the data in the value fields.

From operation 504, the method flows to operation 506 where a determination is made on how to combine the values in the value fields, e.g., by performing statistical calculations. Fields may be of different types, such as numeric fields, textual fields, coded fields, etc., and the data may be aggregated in different ways, such as by calculating statistical values to count the number of values, generate a histogram, generate an average value, generate a median value, identify minimum and maximum values, etc. For example, an aggregation may include identifying the number of data scientists in each area code.

In some example embodiments, aggregating the data includes calculating a value vector that includes the corresponding values for the given values of the key fields. For example, a vector may be created with all the salaries for software developers in company C.

At operation 508, for each data group from the aggregation, the values are combined, e.g., statistical values are calculated, represented as field statistics 510 (e.g., field 1 statistics, field 2 statistics). In some embodiments, statistics based on two or more fields may be calculated, such as statistics 512 for a combination of fields 1 and 2.

The statistics 510, 511 are calculated at different times (e.g., daily, weekly, or monthly, but other frequencies are also possible) and the historical statistics 512 are stored in a database.

At operation 516, the historical statistics 512 are analyzed to see how the data evolves over time. Sudden changes in data trends for a given group are good indicators that the corresponding key fields are good features for the machine-learning model that detects data anomalies.

In some example embodiments, the analysis of the historical data may be used to detect data-evolution anomalies. For example, if the number of data scientists in the US suddenly grows tenfold from one period to the next, there may be a problem in the job-post data collection. This also means that analyzing the number of data scientists is a good feature for the machine-learning model that detects anomalies.

In some example embodiments, the selection of features for the machine-learning model may be performed by a user who analyzes the statistical trends (e.g., shown in charts representing the evolution of the data over time). A user interface is provided to enable users to examine the statistical values and their evolution.

In other example embodiments, the selection of features may be performed by a program based on analysis of how the data behaves over time. Those values that provide good indicators of data-trend changes are then selected as features. Additionally, features may be used by the machine-learning model that are defined either by the user or by a computer program. In some embodiments, the candidate features are presented to a user who then approves which features are to be used for the machine-learning model.

At operation 518, the machine-learning model is used for detecting data anomalies in the evolution of data over time. More details regarding the use of a machine-learning model are provided below with reference to FIG. 7.

FIG. 6 illustrates the grouping of data for value fields, according to some example embodiments. A table 602 illustrates the grouping when using the title field as the key field. The rest of the fields in this example are value fields.

In some example embodiments, a vector of job IDs is created for each title, such as job IDs for data scientists (e.g., [1 4 6 9 10 . . . ]), job IDs for software developers (e.g., [2 11 15 . . . ]), etc.

Similarly, vectors are created for the associated companies, such as companies for data scientists (e.g., [A A C D D . . . ]), companies for software developers (e [B E B . . . ]), etc.

In some example embodiments, statistical values may also be calculated (not shown), such as average salaries for data scientists.

Both vectors resulting from grouping values and the statistical values may be utilized as features for the machine-learning model to detect data anomalies. Once these values are used for the machine-learning model, the machine-learning model provides good insight into the evolution of data over time, including the detection of data anomalies when some data trend changes abruptly (e.g., the number of jobs in a geographical area).

Figure 7:
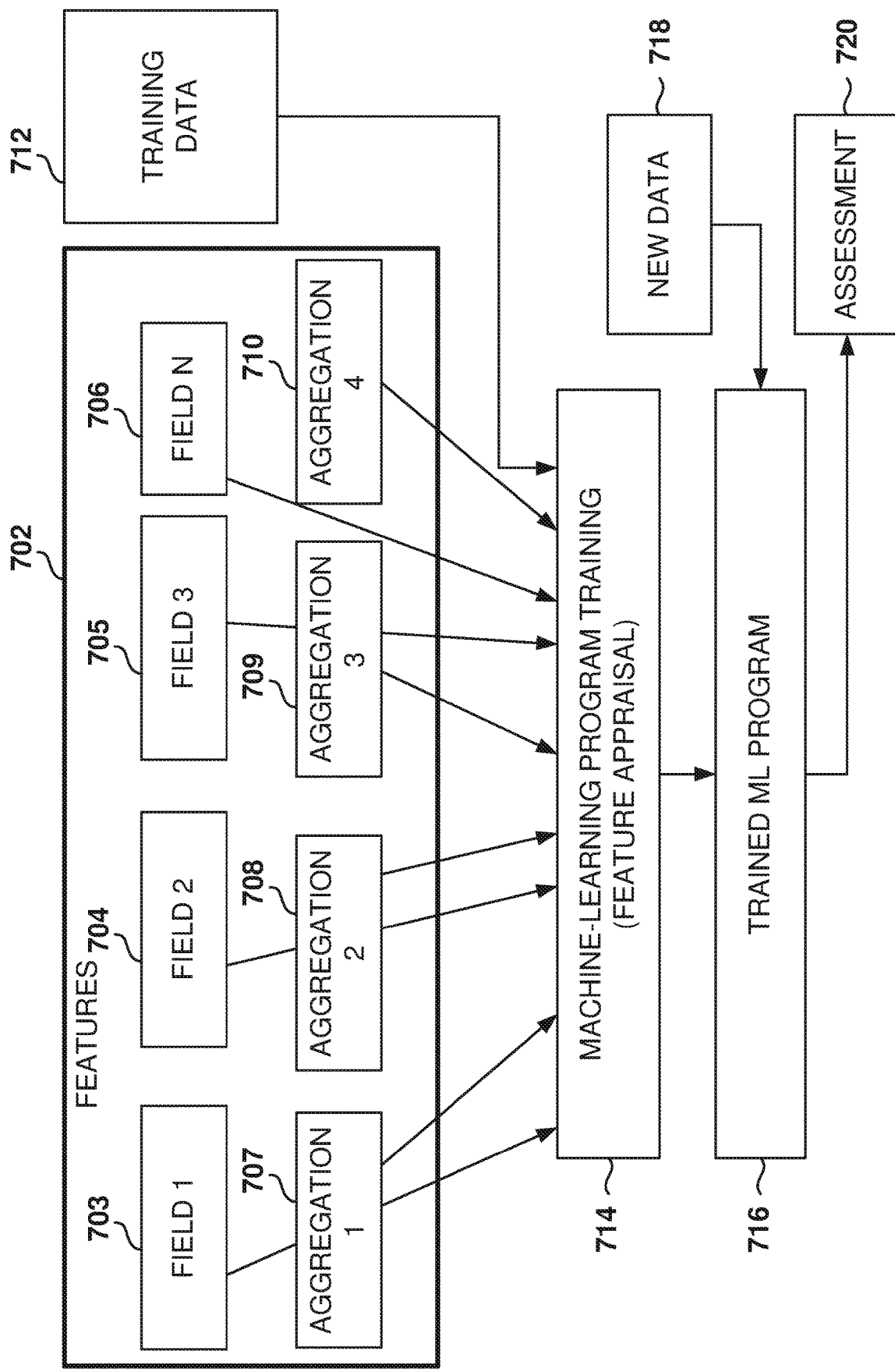
FIG. 7 illustrates the training and use of a machine-learning program, according to some example embodiments.

FIG. 7 illustrates the training and use of a machine-learning program, according to some example embodiments. In some example embodiments, machine-learning programs (MLPs), also referred to as "machine-learning algorithms" or "machine-learning tools," are utilized to perform operations associated with searches, such as job searches.

Machine learning is a field of study that gives computers the ability to learn without being explicitly programmed. Machine learning explores the study and construction of algorithms, also referred to herein as "tools," that may learn from existing data and make predictions about new data. Such machine-learning tools operate by building a model from example training data 712 in order to make data-driven predictions or decisions expressed as outputs or assessments 720. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as "categorization problems," aim at classifying items into one of several category values (for example, is this object an apple or an orange?). Regression algorithms aim at quantifying some items (for example, by providing a value that is a real number).

The machine-learning algorithms utilize features 702 for analyzing the data to generate the assessments 720. A feature 702 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 702 may be of different types and may include one or more features associated with fields in the database (e.g., features 703-706) and one or more features associated with the aggregation of data fields (e.g., features 707-710), as described above. In some example embodiments, one or more features associated with fields in the database may be utilized, while in other embodiments, one or more features associated with the aggregation of data fields may be used.

The machine-learning algorithms utilize the training data 712 to find correlations among the identified features 702 that affect the outcome or assessment 720. In some example embodiments, the training data 712 includes labeled data, which is known data for one or more identified features 702 and one or more outcomes, such as detecting data anomalies. In some example embodiments, the training data 712 includes data from the database and a corresponding label indicating if a data anomaly is present or absent. In some example embodiments, the training data 712 is labeled by a user, and in other example embodiments, the training data 712 is labeled by a computer program.

With the training data 712 and the identified features 702, the machine-learning tool is trained at operation 714. The machine-learning tool appraises the value of the features 702 as they correlate to the training data 712. The result of the training is a trained machine-learning program 716.

When the trained machine-learning program 716 is used to perform an assessment, new data 718 is provided as an input to the trained machine-learning program 716, and the trained machine-learning program 716 generates the assessment 720 as output. In some embodiments, example machine-learning algorithms provide a data-anomaly score (e.g., a number from 1 to 100) that indicates a probability that a data anomaly has been found. In some embodiments, a plurality of probabilities for detecting data anomalies may be obtained, and each probability corresponds to a data field or a feature used by the machine-learning model.

Figure 8:
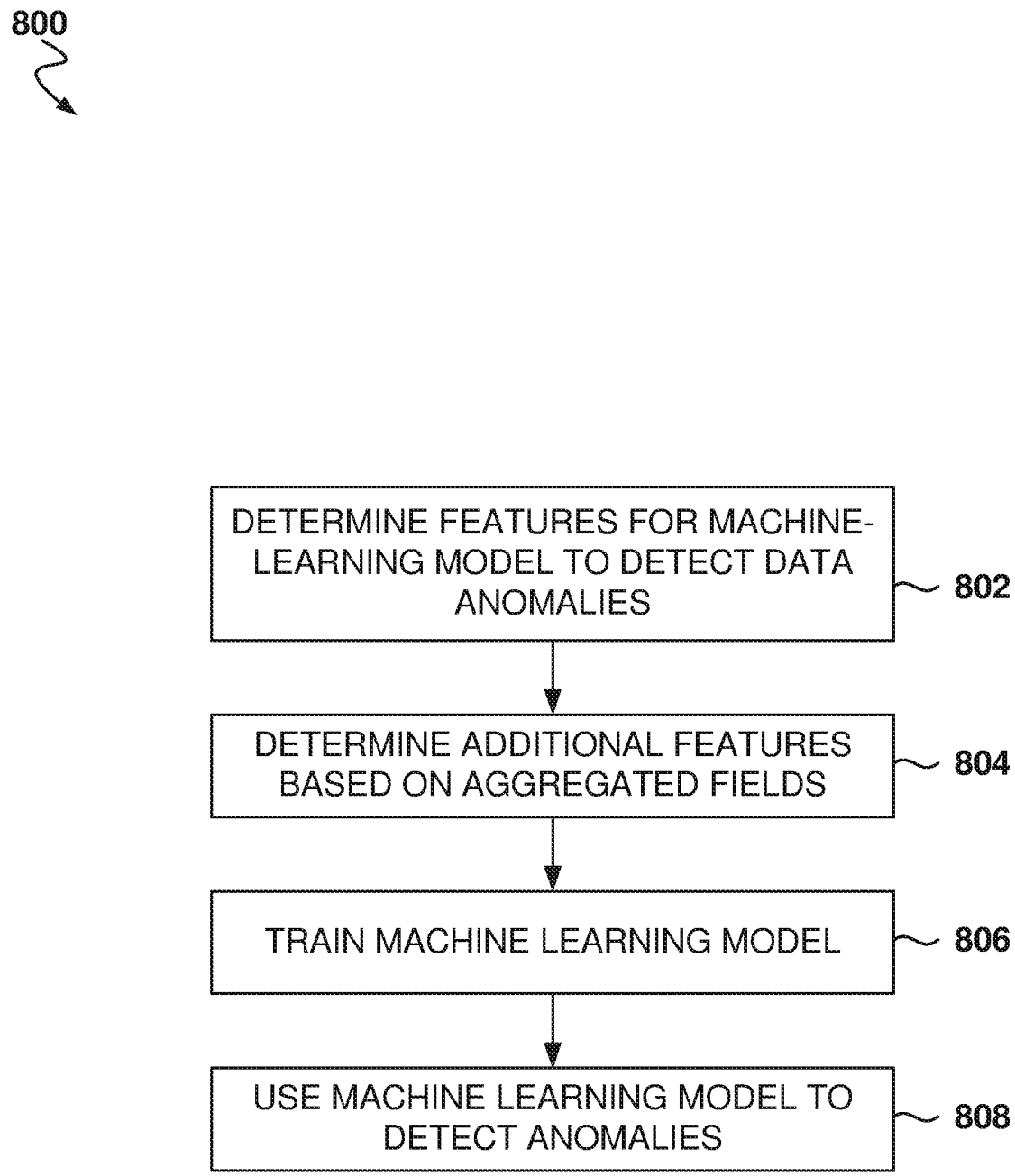
FIG. 8 is a flowchart of a method for detecting data anomalies, according to some example embodiments.

FIG. 8 is a flowchart of a method 800 for detecting data anomalies, according to some example embodiments. While the various operations in this flowchart are presented and described sequentially, one of ordinary skill will appreciate that some or all of the operations may be executed in a different order, be combined or omitted, or be executed in parallel.

At operation 802, the features for a machine-learning model are determined, the machine-learning model being configured for detecting data anomalies in large data sets.

Further, at operation 804, additional features, that are based on aggregated fields, are determined for the machine-learning model. In some embodiments, operation 804 is optional.

At operation 806, the machine-learning model is trained, and at operation 808, the machine-learning model analyzes input data (e.g., data from the database) to make assessments that identify if data anomalies have been detected.

Another general aspect includes a system that includes a memory comprising instructions and one or more computer processors. The instructions, when executed by the one or more computer processors, cause the one or more computer processors to perform operations comprising identifying one or more key fields, from a plurality of fields in a relational database, and a plurality of value fields from the plurality of fields in the relational database. The operations also include grouping data of the value fields based on values of the one or more key fields, and calculating one or more statistical values for each group of data of the value fields. The operations also include monitoring an evolution of the one or more statistical values over time, and selecting, based on the evolution of the one or more statistical values over time, features to be used by a machine-learning model to detect anomalies in content of the relational database over time. The operations also include executing the machine-learning model to detect the anomalies.

In yet another general aspect, a machine-readable storage medium (e.g., a non-transitory storage medium) includes instructions that, when executed by a machine, cause the machine to perform operations comprising identifying one or more key fields, from a plurality of fields in a relational database, and a plurality of value fields from the plurality of fields in the relational database. The operations also include grouping data of the value fields based on values of the one or more key fields, and calculating one or more statistical values for each group of data of the value fields. The operations also include monitoring an evolution of the one or more statistical values over time, and selecting, based on the evolution of the one or more statistical values over time, features to be used by a machine-learning model to detect anomalies in content of the relational database over time. The operations also include executing the machine-learning model to detect the anomalies.

Figure 9:
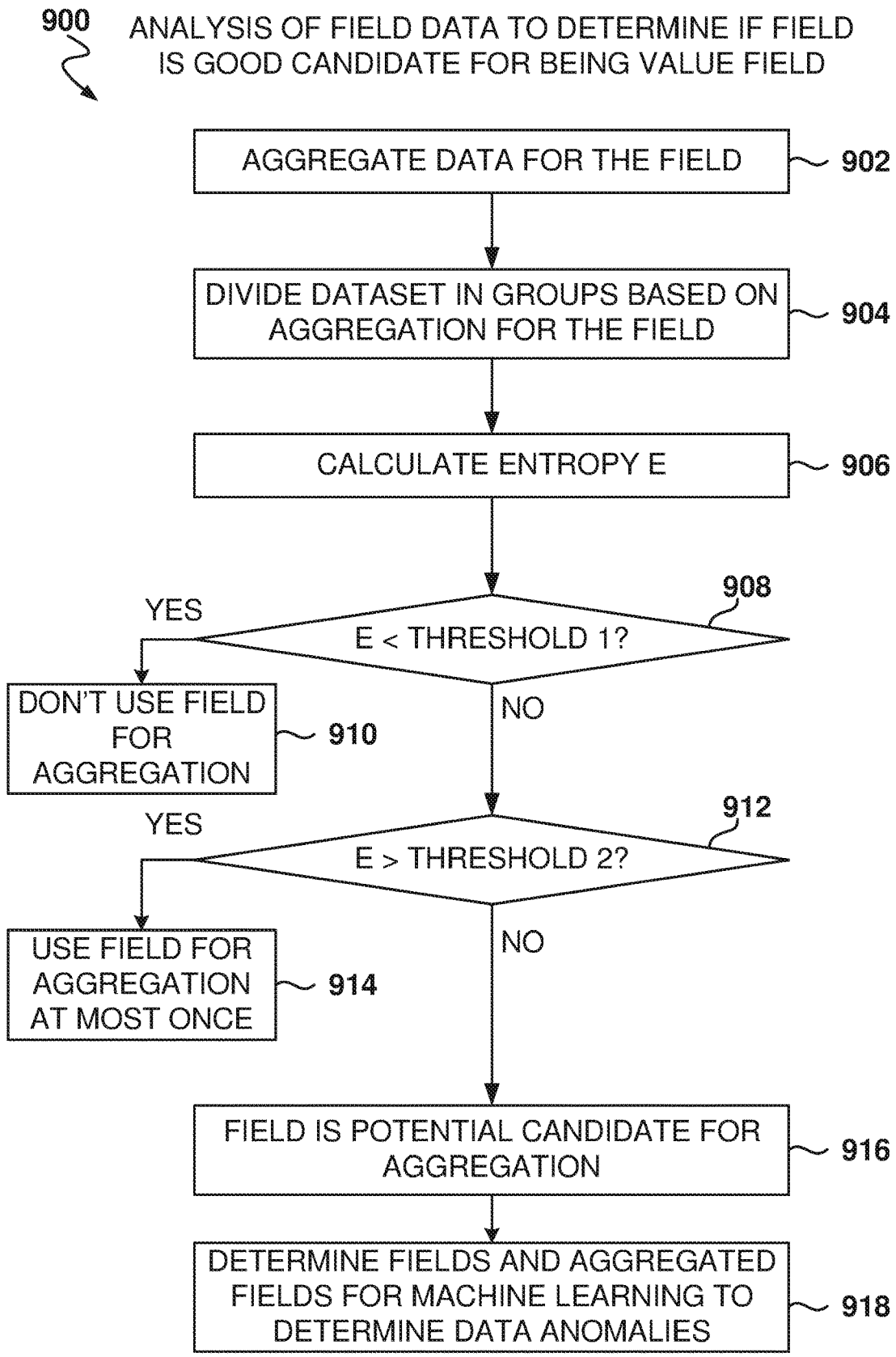
FIG. 9 is a flowchart of a method for determining fields to be used for aggregation based on entropy, according to some example embodiments.

FIG. 9 is a flowchart of a method 900 for determining fields to be used for aggregation based on entropy, according to some example embodiments. Determining which fields are better predictors of data anomalies may be performed by users. However, in large databases, with hundreds or thousands of fields, it is difficult to determine which fields provide more value when used as features for the machine-learning model. As the number of fields grows, the number of possible combinations grows exponentially, so selecting the best field combinations is a difficult task. For example, in a database with 100 different data fields, the total number of possible combinations is greater than 1 million. Further, using too many features makes the learning process of the machine-learning model very slow, as well as the application of the machine-learning model to the data for generating predictions.

To assist users in determining which fields are better for use as features, analysis of data entropy is performed. The method 900 may be executed for each data field in order to determine which are the best data-field aggregations.

At operation 902, the data is aggregated by the selected field; e.g., the selected field is the key field and the rest of the fields are value fields.

From operation 902, the method flows to operation 904 for dividing the data set into groups based on the aggregation by the field. At operation 906, the entropy of the groups is calculated.

Information entropy is the average rate at which information is produced by a stochastic source of data. Entropy measures the degree of our lack of information about a system. The measure of information entropy E associated with each possible data value is the negative logarithm of the probability mass function for the value, as described in the following equation:

$$E = -\Sigma_i P_i \ln P_i$$

Here, $P_i$ is the probability for each of the possible outcomes i. Thus, when the source data has a lower-probability value (i.e., when a low-probability event occurs), the event carries more "information" than when the source data has a higher-probability value. The amount of information conveyed by each event defined in this way becomes a random variable whose expected value is the information entropy. Generally, entropy refers to disorder or uncertainty, and the definition of entropy used in information theory is directly analogous to the definition used in statistical thermodynamics.

At operation 908, a check is made to determine if E is below a first threshold. If the value of information gain (e.g., as measured by E) is too low (e.g., below the first threshold), this feature is much less informative in terms of aggregation. In the extreme case, all the data groups have exactly the same value in a data field. It is not necessary to use such data fields in any combination because they will not help when trying different levels of aggregations.

Thus, if E is less than the first threshold, the method flows to operation 910, where it is determined that the field will not be used for data aggregation. If E is not less than the first threshold, the method flows to operation 912.

At operation 912, a second check is made to determine if E is greater than a second threshold (where the second threshold is greater than the first threshold). If the value of the information gain is too high, this feature is too informative in terms of aggregation. In the extreme case, none of the data values repeat for the data field (e.g., job identifier, since each job post has a unique job identifier). Using this type of data field in any combination will produce almost the same aggregation results. Therefore, the field will not be used, or will be used only once, for aggregation.

If E is greater than the second threshold, the method flows to operation 914, were a determination is made that the field will not be used or will be used only once. If E is not greater than the second threshold, the method flows to operation 916, where the field is identified as a potential candidate for data aggregation.

The first and second thresholds may be fine-tuned by the system based on experimentation to separate the fields into fields that provide good value when being aggregated versus field that do not provide value during aggregation.

At operation 918, a determination is made regarding the use of the field as a feature and the use of the field for creating features resulting from aggregating by the field. The selected features are used by a machine-learning model to determine data anomalies.

Figure 10:
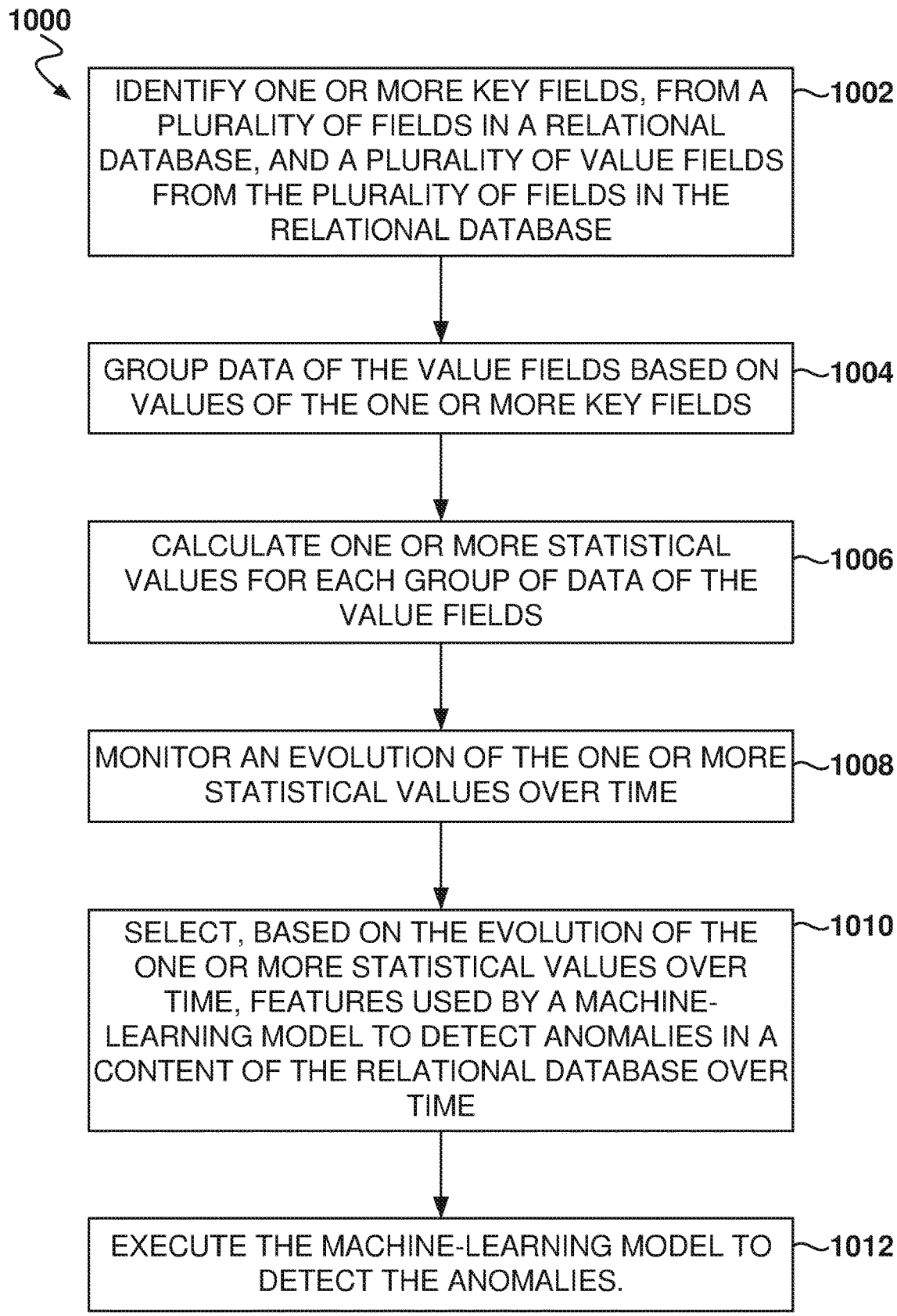
FIG. 10 is a flowchart of a method for selecting features for a machine-learning model configured to detect anomalies in the evolution of data over time, according to some example embodiments.

FIG. 10 is a flowchart of a method 1000 for selecting features for a machine-learning model configured to detect anomalies in the evolution of data over time, according to some example embodiments. While the various operations in this flowchart are presented and described sequentially, one of ordinary skill will appreciate that some or all of the operations may be executed in a different order, be combined or omitted, or be executed in parallel.

At operation 1002, one or more key fields, from a plurality of fields in a relational database, are identified. Also, a plurality of value fields, from the plurality of fields in the relational database, are identified.

From operation 1002, the method flows to operation 1004 for grouping, by one or more processors, data of the value fields based on values of the one or more key fields.

From operation 1004, the method flows to operation 1006, where the one or more processors calculate one or more statistical values for each group of data of the value fields.

From operation 1006, the method flows to operation 1008 for monitoring, by the one or more processors, an evolution of the one or more statistical values over time.

From operation 1008, the method flows to operation 1010 for selecting, based on the evolution of the one or more statistical values over time, features to be used by a machine-learning model to detect anomalies in content of the relational database over time.

At operation 1012, the one or more processors execute the machine-learning model to detect the anomalies.

In one example, the selected features include one or more fields from the plurality of fields and one or more aggregations of fields from the plurality of fields.

In one example, grouping data of the value fields includes, for each unique value combination of the one or more key fields, generating a vector that includes entries, of one of the value fields, corresponding to the unique value combination of the one or more key fields.

In one example, grouping data of the value fields includes, for each unique value combination of the one or more key fields, calculating a statistical measurement for entries, of one of the value fields, corresponding to the unique value combination of the one or more key fields. In one example, the statistical measurement is one or more of an average, a median, a standard deviation, or a percentage change.

In one example, the method 1000 further includes training the machine-learning model with training data that includes data from the relational database and a corresponding label indicating if a data anomaly is present or absent.

In one example, the method 1000 further includes calculating entropy associated with a first field from the plurality of fields, and determining if the first field is a candidate for aggregation as a feature based on the entropy.

In one example, calculating the entropy includes dividing the data in the relational database into groups based on an aggregation by the first field, and calculating the entropy for the groups.

In one example, determining if the first field is a candidate for aggregation includes: in the event that the entropy is below a first threshold, discarding the first field as a candidate for aggregation; in the event that the entropy is above a second threshold, utilizing the first field for aggregation to generate a feature at most one time; and in the event that the entropy is between the first threshold and the second threshold, assigning the first field as a candidate for aggregation.

In one example, the relational database includes information on job posts and web link data for the job posts, where the machine-learning model determines anomalies regarding the job posts and the web link data for the job posts.

Figure 11:
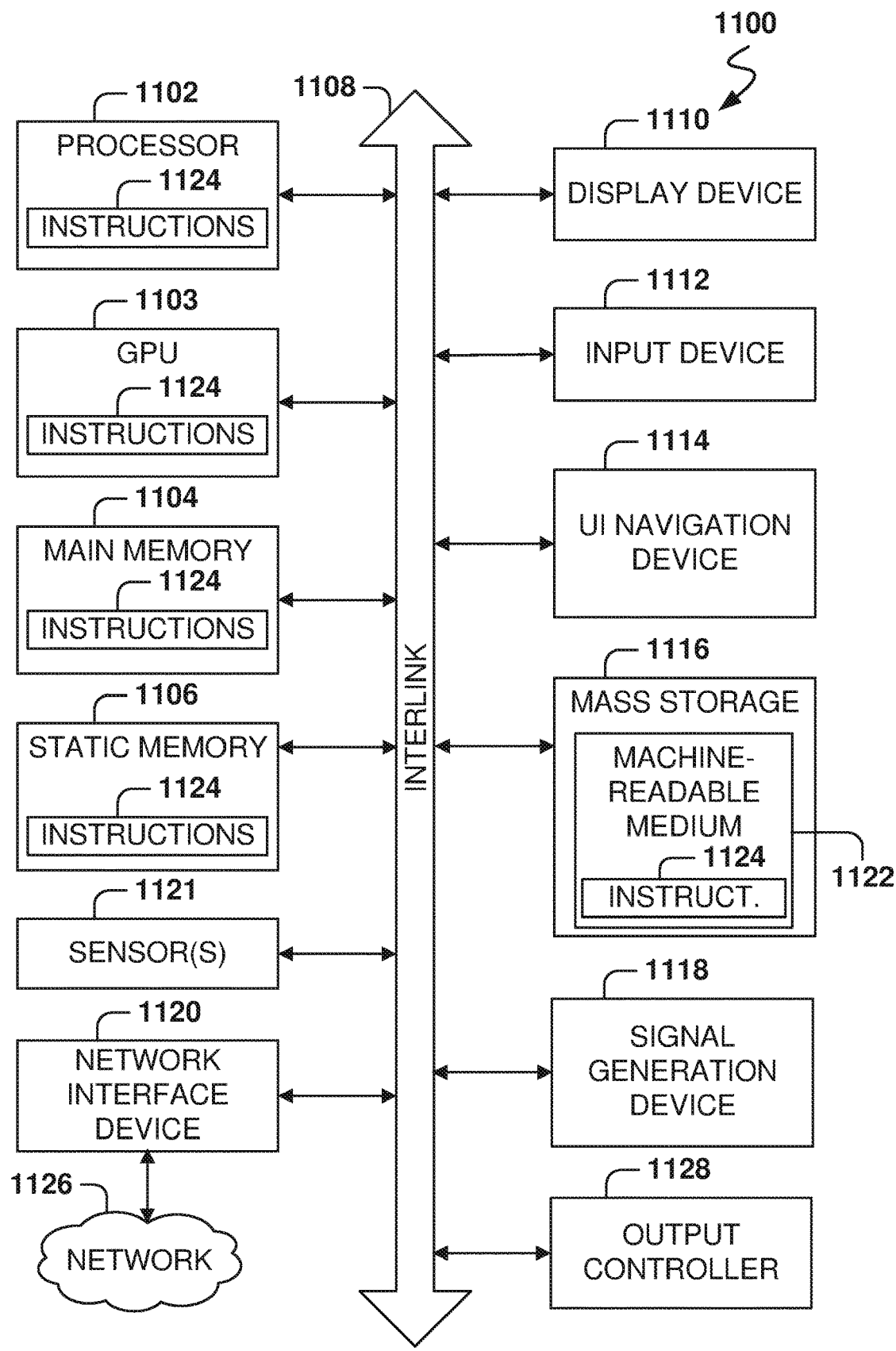
FIG. 11 is a block diagram illustrating an example of a machine upon or by which one or more example process embodiments described herein may be implemented or controlled.

FIG. 11 is a block diagram illustrating an example of a machine 1100 upon or by which one or more example process embodiments described herein may be implemented or controlled. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in a peer-to-peer (P2P) (or other distributed) network environment. Further, while only a single machine 1100 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant-massed particles, etc.) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1100 may include a hardware processor 1102 (e.g., a central processing unit (CPU), a hardware processor core, or any combination thereof), a graphics processing unit (GPU) 1103, a main memory 1104, and a static memory 1106, some or all of which may communicate with each other via an interlink (e.g., bus) 1108. The machine 1100 may further include a display device 1110, an alphanumeric input device 1112 (e.g., a keyboard), and a user interface (UI) navigation device 1114 (e.g., a mouse). In an example, the display device 1110, alphanumeric input device 1112, and UI navigation device 1114 may be a touch screen display. The machine 1100 may additionally include a mass storage device (e.g., drive unit) 1116, a signal generation device 1118 (e.g., a speaker), a network interface device 1120, and one or more sensors 1121, such as a Global Positioning System (GPS) sensor, compass, accelerometer, or another sensor. The machine 1100 may include an output controller 1128, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The mass storage device 1116 may include a machine-readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, within the hardware processor 1102, or within the GPU 1103 during execution thereof by the machine 1100. In an example, one or any combination of the hardware processor 1102, the GPU 1103, the main memory 1104, the static memory 1106, or the mass storage device 1116 may constitute machine-readable media.

While the machine-readable medium 1122 is illustrated as a single medium, the term "machine-readable medium" may include a single medium or multiple media (e.g., a centralized or distributed database, and/or associated caches and servers) configured to store the one or more instructions 1124.

The term "machine-readable medium" may include any medium that is capable of storing, encoding, or carrying instructions 1124 for execution by the machine 1100 and that cause the machine 1100 to perform any one or more of the techniques of the present disclosure, or that is capable of storing, encoding, or carrying data structures used by or associated with such instructions 1124. Non-limiting machine-readable medium examples may include solid-state memories, and optical and magnetic media. In an example, a massed machine-readable medium comprises a machine-readable medium 1122 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device 1120.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    identifying one or more key fields, from a plurality of fields in a relational database, and a plurality of value fields from the plurality of fields in the relational database;
    for each unique combination of values of the one or more key fields, grouping, by one or more processors, data of the value fields for the unique combination;
    calculating, by the one or more processors, one or more statistical values for the data of the value fields in each group;
    monitoring, by the one or more processors, an evolution of the one or more statistical values over time;
    for a first field from the plurality of fields, calculating entropy associated with the first field and determining if the first field is a candidate for aggregation as a feature based on the entropy;
    selecting, based on the evolution of the one or more statistical values over time, features used by a machine-learning model to detect anomalies in content of the relational database over time, wherein the selected features comprise one or more fields from the plurality of key fields and one or more aggregations of fields from the plurality of fields; and
    executing, by the one or more processors, the machine-learning model to detect the anomalies.

2. The method as recited in claim 1, wherein calculating the one or more statistical values comprises:
    generating a vector that includes entries, of one of the value fields, corresponding to the unique value combination of the one or more key fields.

3. The method as recited in claim 1, wherein calculating the one or more statistical values comprises:
    calculating a statistical measurement for entries, of one of the value fields, corresponding to the unique value combination of the one or more key fields.

4. The method as recited in claim 3, wherein the statistical measurement is one or more of an average, a median, a standard deviation, or a percentage change.

5. The method as recited in claim 1, further comprising:
    training the machine-learning model with training data that includes data from the relational database and a corresponding label indicating if a data anomaly is present or absent.

6. The method as recited in claim 1, wherein calculating the entropy comprises:
    dividing data in the relational database into groups based on an aggregation by the first field; and calculating the entropy for the groups.

7. The method as recited in claim 6, wherein determining if the first field is a candidate for aggregation comprises:
    in the event that the entropy is below a first threshold, discarding the first field as a candidate for aggregation;
    in the event that the entropy is above a second threshold, utilizing the first field for aggregation to generate a feature at most one time; and
    in the event that the entropy is between the first threshold and the second threshold, assigning the first field as a candidate for aggregation.

8. The method as recited in claim 1, wherein the relational database includes information on job posts and web link data for the job posts, wherein the machine-learning model determines anomalies regarding the job posts and the web link data for the job posts.

9. A system comprising:
a memory comprising instructions; and
one or more computer processors, wherein the instructions, when executed by the one or more computer processors, cause the one or more computer processors to perform operations comprising:
identifying one or more key fields, from a plurality of fields in a relational database, and a plurality of value fields from the plurality of fields in the relational database;
for each unique combination of values of the one or more key fields, grouping data of the value fields for the unique combination;
calculating one or more statistical values for the data of the value fields in each group;
monitoring an evolution of the one or more statistical values over time;
for a first field from the plurality of fields, calculating entropy associated with the first field and determining if the first field is a candidate for aggregation as a feature based on the entropy;
selecting, based on the evolution of the one or more statistical values over time, features used by a machine-learning model to detect anomalies in content of the relational database over time, wherein the selected features comprise one or more fields from the plurality of key fields and one or more aggregations of fields from the plurality of fields; and
executing the machine-learning model to detect the anomalies.

10. The system as recited in claim 9, wherein calculating the one or more statistical values comprises:
generating a vector that includes entries, of one of the value fields, corresponding to the unique value combination of the one or more key fields.

11. The system as recited in claim 9, wherein calculating the one or more statistical values comprises:
calculating a statistical measurement for entries, of one of the value fields, corresponding to the unique value combination of the one or more key fields.

12. The system as recited in claim 9, wherein the instructions further cause the one or more computer processors to perform operations comprising:
training the machine-learning model with training data that includes data from the relational database and a corresponding label indicating if a data anomaly is present or absent.

13. A non-transitory machine-readable storage medium including instructions that, when executed by a machine, cause the machine to perform operations comprising:
identifying one or more key fields, from a plurality of fields in a relational database, and a plurality of value fields from the plurality of fields in the relational database;
for each unique combination of values of the one or more key fields, grouping data of the value fields for the unique combination;
calculating one or more statistical values for the data of the value fields in each group;
monitoring an evolution of the one or more statistical values over time;
for a first field from the plurality of fields, calculating entropy associated with the first field and determining if the first field is a candidate for aggregation as a feature based on the entropy;
selecting, based on the evolution of the one or more statistical values over time, features used by a machine-learning model to detect anomalies in content of the relational database over time, wherein the selected features comprise one or more fields from the plurality of key fields and one or more aggregations of fields from the plurality of fields; and
executing the machine-learning model to detect the anomalies.

14. The non-transitory machine-readable storage medium as recited in claim 13, wherein calculating the one or more statistical values comprises:
generating a vector that includes entries, of one of the value fields, corresponding to the unique value combination of the one or more key fields.

15. The non-transitory machine-readable storage medium as recited in claim 13, wherein calculating the one or more statistical values comprises:
calculating a statistical measurement for entries, of one of the value fields, corresponding to the unique value combination of the one or more key fields.

16. The non-transitory machine-readable storage medium as recited in claim 13, wherein the machine further performs operations comprising:
training the machine-learning model with training data that includes data from the relational database and a corresponding label indicating if a data anomaly is present or absent.

* * * * *